United States Patent

[11] 3,628,571

[72] Inventors Fritz Ostwald
 Buchschlag;
 Gerhard Nonn, Hofheim, both of Germany
[21] Appl. No. 22,763
[22] Filed Mar. 26, 1970
[45] Patented Dec. 21, 1971
[73] Assignee International Telephone and Telegraph
 Corporation
 New York, N.Y.
[32] Priority Mar. 29, 1969
[33] Germany
[31] P 19 16 334.9

[54] VALVE
 10 Claims, 2 Drawing Figs.
[52] U.S. Cl. ..................................... 137/627.5,
 137/596
[51] Int. Cl. ........................................ F15b 13/04
[50] Field of Search ............................. 137/596,
 596.1, 627.5, 636

[56] References Cited
 UNITED STATES PATENTS
3,459,226 8/1969 Schultz ........................ 137/627.5
3,437,011 4/1969 Van Gelder ................. 137/627.5 X
 FOREIGN PATENTS
1,209,902 9/1959 France ......................... 137/627.5
 923,562 4/1963 Great Britain ................ 137/627.5

Primary Examiner—Robert G. Nilson
Attorneys—C. Cornell Remsen, Jr., Walter J. Baum and Paul W. Hemminger ABSTRACT: In this seat valve the flow direction is in opposition to the valve opening and the valve actuator closes a connection between the chamber on the downstream side of the valve and a low-pressure reservoir before lifting the valve from its seat.

VALVE

BACKGROUND OF THE INVENTION

1. Field of the Invention

The invention relates to valves and particularly to a seat valve to control the flow of pressure medium from a source to an operating circuit or consumer, the valve closure member being lifted from its seat by a mechanical actuator against the closing force of a spring. A hydraulic connection between the hydraulic operating circuit and a low-pressure reservoir is closed before the valve closure member is lifted from its seat.

2. Description of Prior Art

Heretofore seat valves of this type have been designed in such a way that in the open position of the valve the frictional forces of the flow as well as the forces of reaction of the flow pressure act in an opening sense, i.e., contrary to the closing force of a spring, for instance.

A disadvantage of these designs is that the so-called pressure point effect arises which means that the pressure medium flow cannot be changed continuously in conformity with the force exerted externally. Instead the process is disturbed by flow forces after opening of the seat valve to such an extent that the proportionality between control force and pressure medium flow no longer exists. Hysteresis phenomena will arise within the range of pressure drop as well as within the range of pressure increase.

German Pat. No. 842,574 discloses a pressure relief valve in which the control pressure acts upon an annular surface on the closure member, the latter opening in opposition to the direction of flow, thereby causing the pressure of the pressure medium which flows away through a throttling member, to be applied to the proper valve surface at the shutoff cross section. In this way the pressure adapts itself to the operating conditions in the hydraulic circuit.

SUMMARY OF THE INVENTION

An object of the invention is to provide a control valve which can be actuated by external force, with a pressure medium flow being a straight line function of the control force, thus excluding the aforementioned disadvantages.

In a valve embodying this invention the chamber located on the side of the seat valve closure member remote from the direction of opening, communicates with both the low-pressure reservoir and the operating circuit or consumer whereas the chamber located on the other side of the seat valve closing member, i.e., in the direction of opening, is connected to the pressure medium source. The actuator simultaneously moves a valve body in such a way that, prior to the lifting of the seat valve closure member from its seat, the pressure medium connection is closed between the reservoir and the chamber located on the side of the seat valve body remote from the direction of opening. This ensures that the seat valve closure member is always acted upon in a closing direction by the pressure medium flow from the pressure medium source since the direction of opening of the valve closure member and the direction of flow of the pressure medium originating from the hydraulic pressure medium source are opposed.

The valve closing body can be fitted with a calibrated edge at a point which is exposed to the highest flow rate from the source.

DESCRIPTION OF THE SPECIFIC EMBODIMENTS

Figure 1:
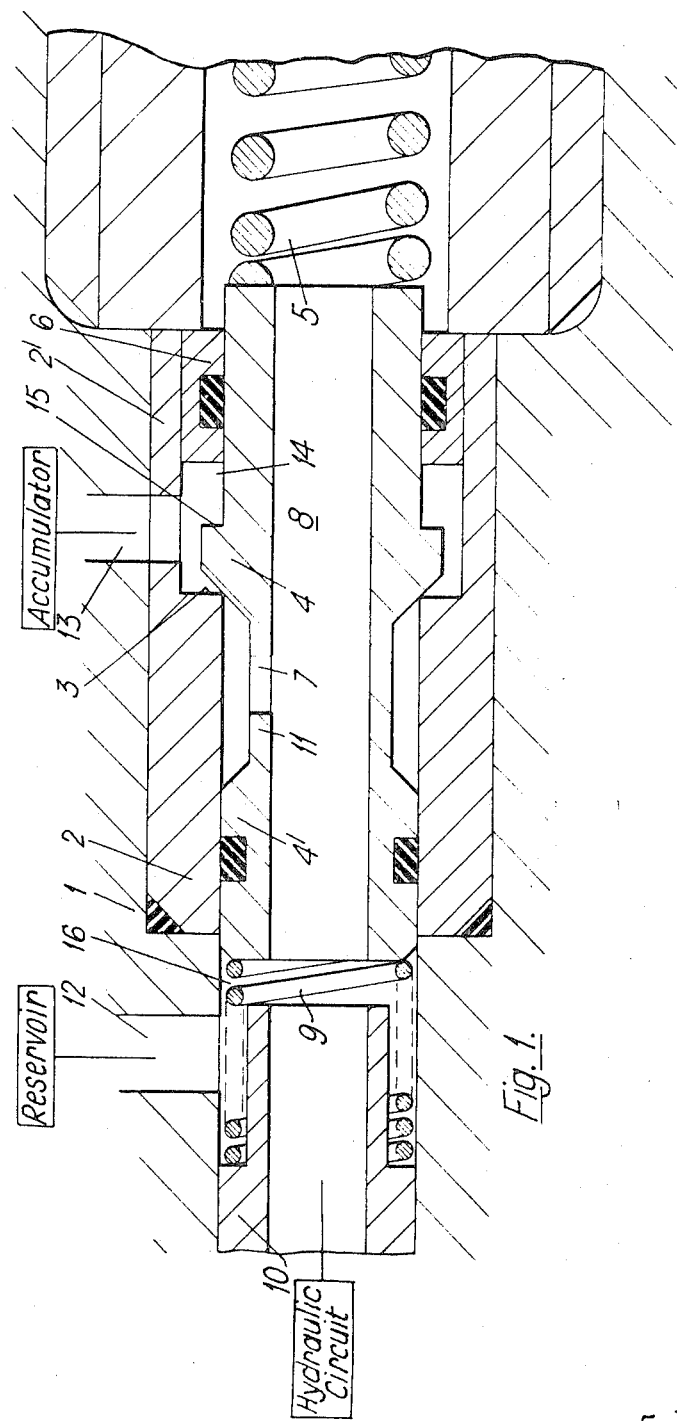
FIG. 1 is a longitudinal section through a valve assembly embodying the invention.

Referring to the embodiment shown in FIG. 1 there is shown a valve housing having a stepped cylinder 1. In the step of the cylinder 1 is fitted a bushing, the inner diameter of which is equal to the smaller diameter of the cylinder 1, the bushing having a step forming the seat 3 for the valve closure member 4 arranged concentrically in the cylinder hollow space and held in its initial closed position by the spring 5.

The smaller diameter part 2 of the bushing supports seals and guides one end 4' of the valve 4 while a bushing 6 arranged between the greater diameter part 2' of the bushing and the valve closure member 4 supports and guides the other end of the valve, limits the valve stroke and provides a seal between the housing and the valve. A recess on the valve surface adjacent the valve seat forms an annular chamber 11 with the bushing member 2. This annular channel 11 communicates with the central bore 8 of the valve closure member 4, 4' through a bore 7 in the wall of the valve. A stepped cylindrical actuator 10 is held away from the valve body by the spring 9.

The spring 9 bears against the end 4' of the valve member 4 and an abutment provided at the outer periphery of the actuator 10. The diameters of the bores in the actuator 10 and in the valve closure member 4, 4' are equal. In rest position of the device there is a connection between the annular chamber 11, which is connected to the hydraulic circuit or consumer and the reservoir via the bore 7, the central bore 8, the intermediate chamber formed between the actuator 10 and the valve member 4 and the bore 12 in the cylinder wall. The bore 13 in the cylinder wall and in the bushing member 2' is followed by the annular chamber 14 which is formed by the steps in the bushing 2, 2', said bore being connected to a pressure-medium accumulator, for instance.

The operation of the valve shown in FIG. 1 is as follows: The actuator member 10 is moved by external force against the force of the spring 9 until the annular surfaces of the actuator member 10 and the end of the valve closure member 4 come to rest one against the other. This will first cause the flow between the hydraulic operating circuit and the reservoir to be blocked and if the actuator 10 is pushed further, the valve closure member 4 will be lifted from its seat against the counteracting force of the spring 5 to open the passage for the pressure medium from the accumulator via bore 13 to the annular chamber 11 and to the hydraulic circuit. The opening stroke of the valve closure member will act opposite to the direction of flow whereby the short-time reduction of the opening forces during opening of the valve as a result of flow effects will be prevented, and if the force controlling the valve decreases, the valve closure member will be returned to its initial position by the force of the spring 5.

Advantageously, the valve closure member is fitted with a calibrated edge 15 at a point which is exposed to the highest flow from the inlet passage 13, the flow forces being controllable by the size and the shape of the calibrated edge.

Figure 2:
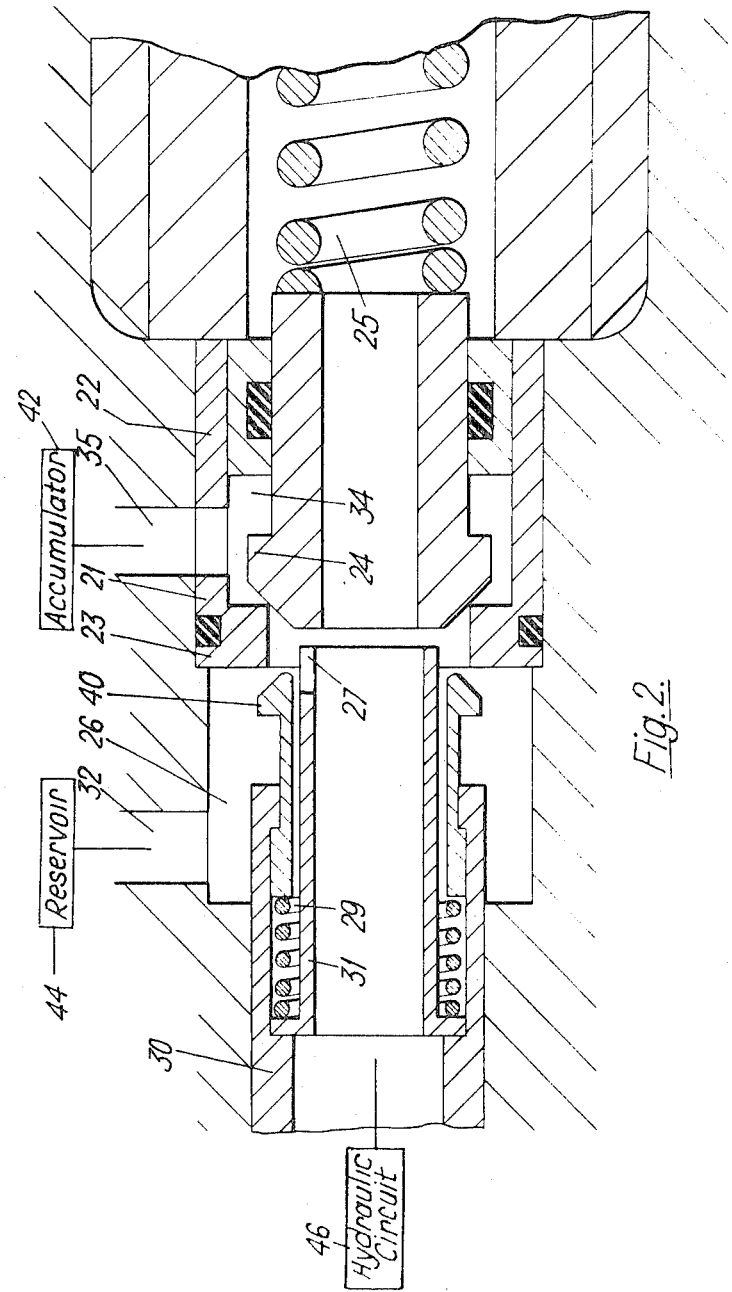
FIG. 2 shows a longitudinal section through a second valve assembly embodying the invention.

FIG. 2 shows another embodiment of the invention in which a bushing 22 is again accommodated in a small step of the inner wall of the cylinder 21, said bushing having an edge protruding radially inwardly and providing the two-faced seat 23 for the valve closure member 24. The limitation of the opening stroke is identical with that of the embodiment shown in FIG. 1. The result is an annular chamber 34 which is separated from the hydraulic operating circuit in the initial closed position of the valve, said annular chamber being connected to an accumulator 42 or other source of pressure via a bore in the bushing 22 and in the cylinder wall 21. The closing force exerted by the spring 25 is assisted by the pressure produced in the accumulator 42. A spring-loaded coaxially arranged closing member 40 rests on the second edge of the seat 23 upon displacement of a double supporting sleeve 30, 31 and thereby interrupts the return flow from the hydraulic circuit to the reservoir, via the intermediate chamber located between the sleeve 31 and the valve closure member 24, the annular chamber 26, resulting from a second larger step in the inner cylinder wall, and the bore 32 connected to the reservoir 44. An annular-shaped shoulder of the sleeve 31 rests in a recess of the sleeve 30, the latter being provided with a radial extension engaging a recess in the closing member 40, the latter being mounted in the resulting chamber between the sleeves 30 and 31. A spring 29 provided in the mentioned chamber bears against the closing member and the sleeve 31. The closing member 40 is pressure-released. Upon further displacement of the supporting sleeves 30 and 31, the sleeve 31 will rest on the valve closure member 24, and thereby open the passage from the accumulator to the hydraulic circuit 46 via the annular chamber 34 and a bore 27 in the sleeve 31. This will cause the pressure medium to flow again in a direction opposite to the opening stroke. The closing force of the spring 25, the frictional force of the flow and the dynamic flow pressure will act in the same direction.

This type of valve can be advantageously used in accumulator brake systems for automotive vehicles or as a pressure control valve or the like for various purposes. At any time the pressure medium flow is directly dependent on the control force.

We claim as our invention:

1. A control valve comprising:
a cylindrical hollow housing having a longitudinal axis;
a first chamber formed within said housing;
a first valve seat associated with said first chamber;
a source of fluid under pressure coupled to said first chamber;
a second chamber formed within said housing spaced from said first chamber, said first valve seat being disposed between said first and second chambers;
a low-pressure reservoir coupled to said second chamber;
a longitudinally movable member disposed coaxially of said longitudinal axis within said housing including a first valve member disposed on the outer surface thereof adjacent said first chamber and a first longitudinal bore through said movable member having a given diameter and disposed coaxially of said longitudinal axis;
a first spring engaging said movable member to hold said first valve member against said first valve seat;
a longitudinal actuator for said movable member disposed coaxially of said longitudinal axis within said housing and longitudinally spaced from said movable member, said actuator having at least a portion thereof adjacent said second chamber and a second longitudinal bore through said actuator having said given diameter and disposed coaxially of said longitudinal axis;
a utilization means coupled to said second bore and being in communication with said reservoir through said second chamber when said valve member is seated on said valve seat;
first means spaced from said first valve seat and disposed between said first and second chambers to provide communication between said first chamber and said utilization means through at least said second bore when said first valve member moves off said first valve seat; and
second means carried by said actuator to close the communication between said reservoir and said utilization means prior to moving said first valve member off said first valve seat when said actuator is moved axially toward said movable member.

2. A valve according to claim 1, wherein
said source of fluid under pressure includes
a source of hydraulic brake fluid; and
said utilization includes
a hydraulic brake circuit.

3. A valve according to claim 1, wherein
said movable member includes on the outer surface thereof
a calibrated edge disposed in said first chamber at a point which is exposed to the greater flow from said source of fluid.

4. A valve according to claim 1, wherein
said first means includes
a third chamber disposed between said housing and said movable member between said first and second chambers, and
at least one aperture through the wall of said movable member between said first bore and said third chamber,
said third chamber, said one aperture and said first and second bores providing communication between said first chamber and said utilization means when said valve member moves off said first valve seat.

5. A valve according to claim 1, wherein
the adjacent ends of said movable member and said actuator are disposed adjacent said first valve seat and are in communication with said first chamber when said first valve member is moved off said first valve seat, and
said first means includes
at least one opening through the wall of said adjacent into said second bore in the end of said actuator adjacent an end of said movable member.

6. A valve according to claim 1, further including
a second valve seat associated with said second chamber disposed between said first and second chambers; and wherein
said second means includes
a second valve member carried by said actuator to engage said second valve seat to close the communication between
said reservoir and said utilization means prior to moving said first valve member off said first valve seat.

7. A valve according to claim 6, wherein
said housing includes
an inwardly extending radial portion disposed between said first and second chambers carrying thereon said first and second valve seats.

8. A valve according to claim 1, wherein
said second means includes
the end of said actuator adjacent an end of said movable member, the engagement of the adjacent ends of said actuator and said movable member upon actuation of said actuator closing the communication between said reservoir and said utilization means prior to moving said first valve member off said first valve seat.

9. A valve according to claim 1, wherein
said housing includes
an inwardly extending radial portion disposed between said first and second chambers carrying thereon said first valve seat.

10. A valve according to claim 1, further including
a second spring associated with said actuator to bias said actuator into its spaced relation with respect to said movable member.

* * * * *